United States Patent
Gascoyne et al.

(10) Patent No.: US 6,949,308 B2
(45) Date of Patent: Sep. 27, 2005

(54) GAS DIFFUSION SUBSTRATE

(75) Inventors: John Malcolm Gascoyne, Bucks (GB); Graham Alan Hards, Reading (GB); Karen Leanne Hogarth, Reading (GB); Thomas Robertson Ralph, Reading (GB); Stephen John Edwards, Cumbria (GB); Nigel Julian Walker, Cumbria (GB)

(73) Assignees: Johnson Matthey Public Limited Company, London (GB); Technical Fibre Products Limited, Cumbria (GB)

(*) Notice: Subject to any disclaimer, the term of this patent is extended or adjusted under 35 U.S.C. 154(b) by 337 days.

(21) Appl. No.: 10/257,794

(22) PCT Filed: Apr. 12, 2001

(86) PCT No.: PCT/GB01/01655

§ 371 (c)(1),
(2), (4) Date: Oct. 16, 2002

(87) PCT Pub. No.: WO01/80342

PCT Pub. Date: Oct. 25, 2001

(65) Prior Publication Data

US 2003/0134179 A1 Jul. 17, 2003

(30) Foreign Application Priority Data

Apr. 17, 2000 (GB) .............................................. 0009319
Jan. 25, 2001 (GB) .............................................. 0101942

(51) Int. Cl.⁷ .......................... H01M 4/86; D04H 5/00; D04H 13/00
(52) U.S. Cl. ........................ 429/42; 429/44; 428/297.4; 428/367; 442/334; 442/349
(58) Field of Search .............................. 429/30, 44, 42; 428/297.4, 367; 252/511; 442/334, 349

(56) References Cited

U.S. PATENT DOCUMENTS

| 5,246,794 A | 9/1993 | Blomgren et al. ........... 429/101 |
| 5,691,054 A | 11/1997 | Tennent et al. ............. 428/359 |
| 5,800,706 A | 9/1998 | Fischer .................... 210/198.2 |

FOREIGN PATENT DOCUMENTS

| EP | 0 731 520 | 9/1996 |
| EP | 0 791 974 | 8/1997 |
| WO | WO 97/32646 | 9/1997 |
| WO | WO 99/33132 | 7/1999 |
| WO | WO 00/47816 | 8/2000 |
| WO | WO 00/55933 | 9/2000 |

OTHER PUBLICATIONS

D. Bevers er al., "Examination of the Influence of PTFE coating on the properties of carbon paper in polymer electrolyte fuel cells," *Journal of Power Sources*, vol. 63 (1996), pp. 193–201.

International Search Report, dated Sep. 6, 2001, from corresponding International Application No. PCT/GB01/01655.

British Search Report, dated Feb. 23, 2001, from British priority application No. 0101942.1.

*Primary Examiner*—Patrick Joseph Ryan
*Assistant Examiner*—Thomas H. Parsons
(74) *Attorney, Agent, or Firm*—RatnerPrestia

(57) ABSTRACT

A fuel cell gas diffusion substrate has primary fibres, secondary fibres and one or more thermoplastic polymers for binding the primary and secondary fibres, characterized in that the secondary fibers are in the form of carbon nanofibers, and a gas diffusion electrode and membrane electrode assembly prepared therefrom are disclosed.

18 Claims, 3 Drawing Sheets

(Magnification x 240,000)

GAS DIFFUSION SUBSTRATE

BACKGROUND OF THE INVENTION

The present invention relates to a novel gas diffusion substrate for a fuel cell, comprising primary and secondary fibres, and an electrode prepared therefrom. The invention further relates to a process for the manufacture of the substrate and electrode.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol is oxidised at the anode and oxygen is reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. The electrolyte also has to be in contact with both electrodes and in fuel cell devices may be acidic or alkaline, liquid or solid, in nature. In the proton exchange membrane fuel cell (PEMFC), whether hydrogen or methanol fuelled, the electrolyte is a solid proton-conducting polymer membrane, commonly based on perfluorosulphonic acid materials. The PEMFC is the most likely type of fuel cell to find wide application as a more efficient and lower emission power generation technology in a range of markets including stationary and portable power generation devices and as alternative engines to the internal combustion engine in transportation.

In the PEMFC the combined laminate structure formed from the membrane and the two electrodes is known as a membrane electrode assembly (MEA). The MEA will typically comprise several layers, but can in general be considered, at its basic level, to have five layers defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum metal based, to maximise the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode gas diffusion substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton conducting electrolyte in contact with the same electrocatalyst reaction sites. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However, it is also the case with proton conducting membrane electrolytes, that if too much water is removed from the cathode structure, the membrane can dry out and the performance of the fuel cell also decreases.

The complete MEA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates and a solid proton-conducting polymer membrane catalysed on both sides; or indeed the MEA may be formed from one gas diffusion electrode and one gas diffusion substrate and a solid proton-conducting polymer catalysed on the side facing the gas diffusion substrate.

Gas diffusion substrates or electrodes are employed in many different electrochemical devices in addition to fuel cells, including metal-air batteries, electrochemical gas sensors, and electrochemical reactors for the electrosynthesis of useful chemical compounds.

Traditionally, the gas porous substrates used in the PEMFC are based on high density materials such as rigid carbon fibre papers like Toray TGP-H-60 or TGP-H-90 (Toray Industries Inc.) or woven carbon cloths, such as Zoltek PWB-3 (Zoltek Corporation, 3101 McKelvey Road, St. Louis, Mo. 63044). These materials present a number of problems in terms of cost, compatibility with high volume manufacturing processes and adaptability to the characteristics required for a wide range of cell designs and operating regimes. Current estimates suggest that these types of material are at least an order of magnitude too expensive for many applications, particularly for transportation, and their physical structure cannot be readily modified to ensure compatibility with the range of operating conditions envisaged. With existing carbon fibre papers the rigidity of the material precludes the development of high volume reel to reel processes, which offer the most attractive route for the manufacture of the quantities of MEAs required. Carbon cloths could be used in reel to reel processes but their dimensional instability and tendency to fray at cut edges impose significant additional difficulties in scaling up to high volume processes. For PEMFC's to become commercially viable power sources over a range of applications the gas porous substrate will require a manufacturing process capable of producing millions of square metres of material at very low cost and also able to allow specific structural properties to be imported to the material for each application.

More recently, flexible electrode structures based on a porous substrate comprising a non-woven web of carbon fibres bound by a thermoplastic polymer have been disclosed. The non-woven web is filled or coated with particulate material such as carbon to achieve the required electrical conductivity. EP 0 791 974 demonstrates that electrodes based on non-woven webs have comparable performances to structures based on carbon fibre paper or cloth, without the drawbacks previously outlined.

Gas diffusion substrates based on filled/coated non-woven webs can be produced with a wide range of specific structural properties, as shown in WO 00/47816 and WO 00/55933. The present inventors have now produced a gas diffusion substrate with alternative properties to those known in the art. The properties are conferred by a type of non-woven web that has different electrical conductivity and fibre packing properties to the non-woven carbon fibres webs used in the prior art.

SUMMARY OF THE INVENTION

Accordingly the present invention provides a fuel cell gas diffusion substrate comprising primary fibres, secondary fibres in the form of carbon nanofibres, one or more thermoplastic polymers for binding said primary and secondary fibres, and a carbon based filler/coating material wherein the loading of the carbon based filler/coating material is more than 15 wt % based on the weight of the gas diffusion substrate.

DETAILED DESCRIPTION OF THE INVENTION

The primary fibres are carbon fibres as used in prior art non-woven web gas diffusion substrates. Suitably, the primary fibres have a cross-sectional dimension of at least 1 micron. The primary fibres are suitably selected from the group consisting of longer fibres and shorter fibres, or a combination of longer and shorter fibres. The longer fibres are of average length greater than 3 mm and suitably have a maximum average length of 50 mm The preferred average length of the fibres is 5 mm to 30 mm. The diameter of the longer fibres is typically in the range of 1 microns to 25 microns, suitably in the range of 1 microns to 20 microns, and preferably from 1 micron to 15 micron, for example 4 to 12 micron, such as 5 to 10 micron. The shorter fibres have an average length of less than 3 mm, suitably are of average length less than 2 mm, preferably less than 1 mm. The shorter fibres have a minimum length of 50 microns, preferably 100 microns. The diameter of the shorter fibres is typically in the range 1 microns to 20 microns, preferably 1 microns to 10 microns.

For the purposes of this patent carbon fibres can, at the fundamental level be defined as fibres having a high carbon content (typically greater than 95% carbon and more typically greater than 99% carbon) and an atomic structure that is generally graphitic in character. The degree of order of the graphite structure and the ratio of graphitic to amorphous carbon will be determined by the starting material processing conditions and thermal treatment.

The nature of the atomic structure can vary significantly from highly graphitic, but with high crystalline disorder (as in vitreous carbon) to lower levels of graphitisation but highly ordered structures typical of high tensile fibres. Hence the physical properties such as the density, tensile strength, thermal conductivity and electrical conductivity can vary significantly.

Figure 1:
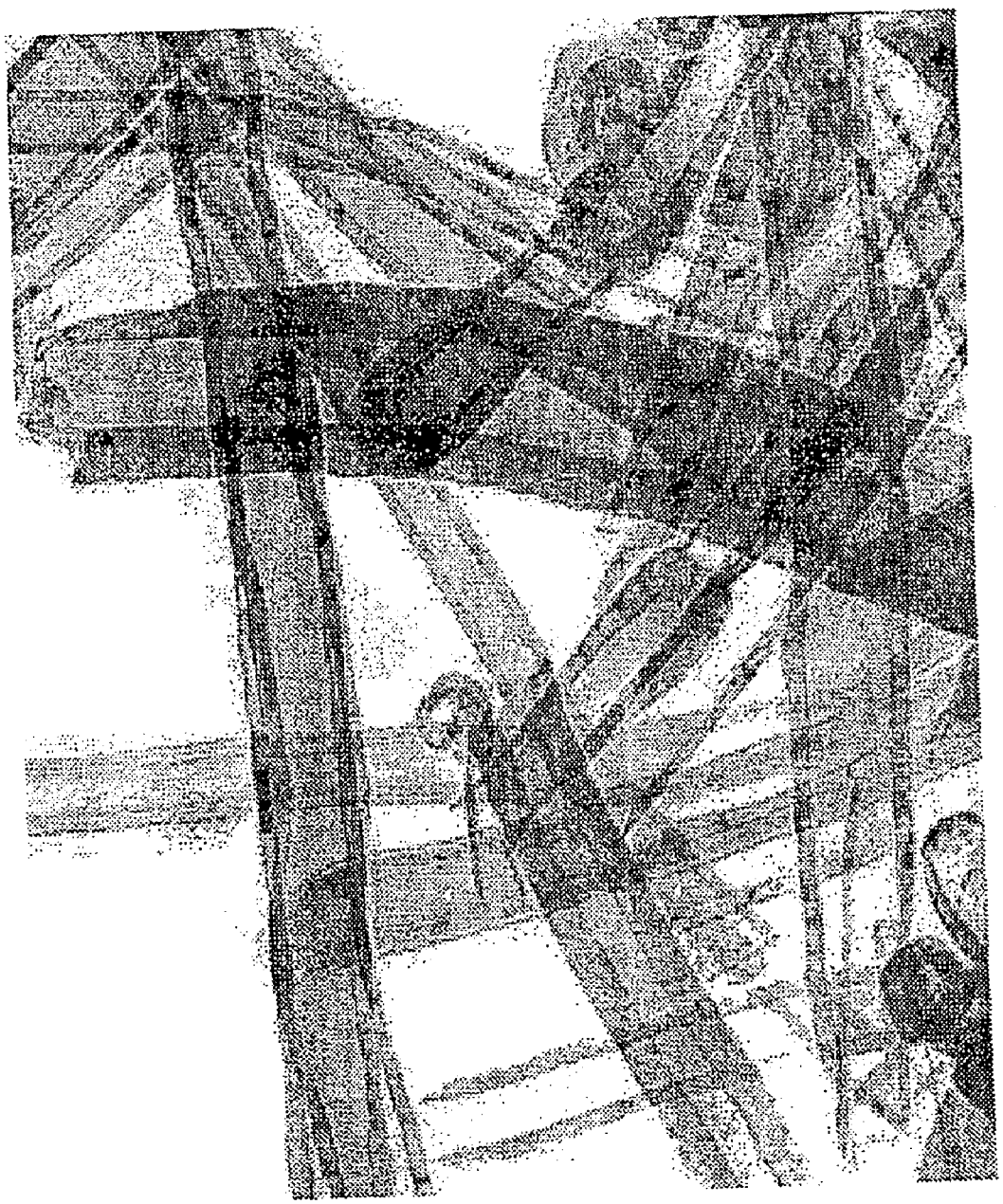
FIG. 1 illustrates a vapour grown graphitic or semi-graphitic carbon structure (tubular, solid, or intermediate in nature) that exist as curved, intertwined entanglements or clusters.

The secondary fibres are those classed as carbon whiskers and fibrils (referred to herein as 'nanofibres') as supplied, for example, by Applied Sciences Inc., 141 West Xenia Avenue, Cedarville, Ohio 45314-0579, U.S.A. or Nikkiso Co. Ltd., 43-2 Ebisu 3-chome, Shibuya-ku, Tokyo 150-91, Japan. These nanofibres are not conventional carbon fibres as used in prior art gas diffusion substrates. They have distinct properties and are not merely very small conventional carbon fibres. The fibres can be produced with much smaller fibre diameters and shorter fibre lengths than conventional carbon fibres. They also have a different morphology from the materials normally classified as carbon fibres. The carbon whiskers and fibrils (nanofibres) are typically vapour grown graphitic or semi-graphitic carbon structures (tubular, solid or intermediate in nature) that exist as curved, intertwined entanglements or clusters, as shown in FIG. 1. The diameter of the nanofibres can typically be adjusted from 10 nanometres to 500 nanometres and their length from 1 micron to 100 microns. Typical aspect ratios range from 5 to as high as 1000. In the present invention, the nanofibres used suitably have a length less than 100 microns, preferably less than 50 microns. The diameter of the nanofibres is suitably less than 500 nm, preferably less than 200 nm, more preferably less than 100 nm Preferably, the primary carbon fibres constitute between 10 and 90 wt % of the total weight of fibres and the secondary fibres constitute between 10 and 90 wt % on the same basis.

The primary and secondary fibres are held together by one or more thermoplastic polymeric substances (the "final polymer"). Depending on the polymeric substance(s) used it may also contribute to the essential electrode structural properties in the gas diffusion substrate, such as tensile strength, flexibility and control of the hydrophobic/hydrophilic balance. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred final polymer is PTFE or FEP.

In addition to the primary and secondary fibres, one or more continuous strands comprising a plurality of tertiary carbon fibres may be embedded within the gas diffusion substrate. The tertiary fibres in the one or more continuous strands may be present in the form of a tow or yarn. A tow is an essentially parallel collection of synthetic fibres preparatory to spinning, and a yarn is a continuous twisted strand of two or more fibres. When two or more continuous strands are embedded within the substrate, the fibres in each continuous strand may be in the form of a tow or yarn, or a combination thereof.

The or each continuous strand(s) are made up of a plurality of tertiary carbon fibres, and suitably comprise at least 100 fibres. The total number of carbon fibres in each strand will depend on the required thickness of the substrate and the application for which it is to be used. The maximum length of the tertiary fibres is determined by the dimensions of the substrate and the orientation of the continuous strand within the substrate. For example, the continuous strand may extend from one edge of the substrate to any one of the other edges, or the continuous strand may extend from one edge of the substrate to the same edge. In all cases, the length of the tertiary carbon fibres will be dependent on the length of the continuous strand. The diameter of the tertiary carbon fibres is typically in the range of 0.2 microns to 25 microns, preferably in the range of 2 microns to 20 microns. The final profile of the strand(s) within the substrate will depend on the number and thickness of fibres in the strand and the final thickness of the substrate. The or each continuous strand is embedded within the substrate. When more than one continuous strands are present, each continuous strand may be at an equal depth or at varying depths (i.e. variation in the z-direction) within the substrate, or a combination thereof. The continuous strand(s) may be applied at any orientation and at any spacing. The continuous strand(s) may also have applied to the surface, or impregnated within the strand, a final polymer or polymers which may be the same as or different from the final polymer in the non-woven carbon fibre gas diffusion substrate. Examples of such polymers include PTFE, FEP, PVDF, Viton A, polyethylene, polypropylene and ethylene-propylene. The preferred final polymer is PTFE or PEP.

The carbon based filler/coating material comprises a mixture of a particulate carbon and one or more polymers, the carbon suitably being in the form of a powder. The carbon powder may be any of the materials generally designated as carbon black such as acetylene blacks, furnace blacks, pitch, coke-based powders and graphitised versions of such materials. Suitably also both natural and synthetic graphites may be used in this application. Such materials may be used either alone or in combination. The particulate carbon, or carbons, in the base filler/coating material are held together by one or more polymers. The polymeric materials used will contribute to the essential electrode structural properties such as pore size distribution, hydrophobic/hydrophilic balance and physical strength of the gas diffusion layer. It is preferable that the polymer is relatively hydrophobic thereby rendering the base filler/coating material as a whole hydrophobic. Examples of such polymers include PTFE, FEP, PVDF, Viton A, polyethylene, polypropylene and ethylene-propylene. The preferred polymers are PTFE or FEP.

The carbon based filler/coating material may further comprise a catalyst other than an electrocatalyst, for example a gas phase catalytic component which is designed to remove contaminant gases in the fuel or oxidant feed streams, as for example carbon monoxide in the hydrogen fuel when this is supplied from a reformer. The gas phase catalytic component comprises a supported or unsupported metal or mixed metal catalyst suitably active for the oxidation of carbon monoxide to carbon dioxide and which is isolated from the electrocatalytic component by the absence of any proton conducting material within the structure.

The carbon based filler/coating material may further comprise a modifier material or materials, which are added to the carbon based filler/coating material in order to change the water management properties of the structure. One or more modifier materials are hydrophilic in nature relative to the carbon based filler material. Preferably, the one or more modifier materials are based on carbon, glass, silica or ceramics, which may be hollow, porous or solid and are more preferably essentially spherical or fibrous materials. By the term essentially spherical, we mean that the modifier material may be spherical, spheroidal, ellipsoidal or any shape which approximates to a sphere, spheroid or ellipsoid. By the term fibrous, we mean that the modifier material is of a fibrous nature. That is the length is far greater than the width or diameter; in general the fibres would not be longer than approximately 3 mm. Specific examples of the modifier material include carbon wool, carbon nanofibres (as defined hereinbefore), quartz wool, silica micro-fibres, blown or sprayed ceramic fibres, carbon micro-spheres, glass microspheres, colloidal or fumed silica and zeolites.

Further descriptions of the carbon based filler/coating material and the modifier material may be found in PCT Application WO 00/55933 which is incorporated herein by reference.

The loading of the carbon based filler/coating material is more than 15 wt % based on the weight of the gas diffusion substrate, suitably more than 25 wt % and preferably more than 35 wt %.

The gas diffusion substrate may be prepared in a two step process wherein the first step is the formation of a non-woven web comprising the primary fibres, the secondary fibres and the one or more thermoplastic polymers, and the second step is the filing or coating of the web with the carbon based filler/coating material.

The non-woven web may be made by either a wet-lay or a dry-lay process and may be made by a single individual process or by adapting a continuous manufacturing process, such as paper making or felt making, to form a continuous web. In the case of a wet-lay process, the primary and secondary fibres are dispersed as a suspension in, preferably water, to form a slurry. Also added to the slurry are one or more polymers (the "first polymer"), preferably hydrophilic polyrers, for example polyvinylalcohol (PVA). The first polymer may be in the form of fibres. Once the primary and secondary fibres and the first polymer are uniformly dispersed in the liquid, the resultant slurry is drained through a suitable mesh in order to form a coherent layer of the web. In the case of a single individual process the fibres are deposited onto a mesh in a conventional hand sheet maker. In the case of a continuous manufacturing process, a continuous structure is formed by the controlled deposition of the slurry onto a moving mesh belt. The web so-formed by either method is dried in an oven to set the first polymer. If necessary the web is placed in a solution of the final polymer, eg a thermoplastic polymer such as PTFE, which may or may not be the same as the first polymer, allowed to dry and subsequently heat-treated to set the final polymer. If it is not desirable for the first polymer to remain in the final web structure, it may be removed by this heat treatment or by an alternative appropriate process. In addition, any undesirable residues may be removed by the heat treatment or by an alternative appropriate process.

The flexible non-woven carbon fibre gas diffusion substrate may be prepared by taking a non-woven web, applying the carbon based filler/coating material to one or both sides of the web to form a substrate and subsequently hot pressing. The majority of the filler/coating material will be forced into the structure of the non-woven web, although a small quantity may remain on the surface. Preferably a thin layer of the filler/coating material remains as a surface coating on one or both sides of the web.

The web may be in-filled by the base filler/coating material by any method known in the art. Such methods include screen printing, dip coating, nip coating, spray coating and other coating processes known to those skilled in the art.

Alternatively, the gas diffusion substrate may be prepared using a one step process similar to that used to prepare the non-woven web. For example, the carbon based filler/coating material and where appropriate the modifier material or materials may also be added to the slurry, and a continuous structure formed by the controlled deposition of the slurry onto a moving mesh belt and drying the formed gas diffusion substrate. The substrate formed may subsequently have a surface coating of filler/coating material applied to one or both sides.

A further aspect of the invention provides a gas diffusion electrode comprising a gas diffusion substrate as hereinbefore described and an electrocatalyst material. The electrocatalyst material is applied as a thin layer to the surface of the gas diffusion substrate. Some of the electrocatalyst material may penetrate slightly into the substrate, the remaining material forming a layer on the surface of the substrate. The electrocatalyst material comprises one or more electrocatalytic components and a polymer. Suitable polymers include hydrophobic polymers, such as PTFE and/or proton conducting polymers, such as perfluorinated sulphonic acids like Nafion®. The electrocatalytic component is defined as a substance that promotes or enhances the rate of the electrochemical reaction of interest but remains unaltered by the reaction. The electrocatalytic component or components selected will depend on the application for which the gas diffusion electrode is being used. These may be, for example, a precious metal or a transition metal as the metal or metal oxide, either unsupported or supported in a dispersed form on a carbon support; an organic complex, in the form of a high surface area finely divided powder or fibre, or a combination of these options. An example of a suitable electrocatalyst material is described in EP 0731520.

A further aspect of the invention provides a membrane electrode assembly comprising a gas diffusion substrate of the invention as hereinbefore defined. Alternatively, the invention provides a membrane electrode assembly comprising a gas diffusion electrode of the invention as hereinbefore defined.

Still further aspects of the invention include (i) a fuel cell comprising a gas diffusion substrate according to the present invention, (ii) a fuel cell comprising a gas diffusion electrode according to the present invention, and (iii) a fuel cell comprising a membrane electrode assembly according to the invention.

Other applications for which one or more of the embodiments of the invention may be used, in addition to fuel cells, include, but are not limited to, metal-air batteries, electrochemical gas sensors, electrochemical reactors for the electrosynthesis of useful chemical compounds and separator mats for batteries.

The following examples are illustrative but not limiting of the invention:

EXAMPLE 1

1.0 g of chopped carbon fibres at a fibre length of 6 mm, and 1.0 g of chopped carbon fibres at a fibre length of 12 mm (type RK 25 supplied by RK Carbon Fibres Ltd.) along with 0.7 g of carbon nanofibres (type Pyrograf III, grade PR-24-AG supplied by Pyrograf Products, Inc., Cedarville, Ohio, U.S.A.), and 0.5 g of polyvinyl alcohol fibres (type Mewlon SML supplied by Unitika Ltd., Oska 541, Japan) were dispersed in 3 litres of water using a standard catering blender. The resulting dispersion was used to prepare a sample of non-woven sheet of size 330 mm diameter (855.3 $cm^2$) in a custom built sheet former similar in general operation to a standard SCA sheet former, as supplied by AB Lorentzen & Wettre, Box 4, S-163 93 Stockholm, Sweden. The sheet was dried at 100° C. in air.

The non-woven carbon fibre sheet was dipped for 5 minutes in a solution of 130 weight parts of a suspension of PTFE (ICI Fluon dispersion GP1, 64 wt % solids suspension) in 2500 weight parts of water. The sheet was drained vertically until dry and the resulting sheet fired, in air, to 385° C. for 15 minutes, to give a 33.8 wt % loading of PTFE.

The carbon based filer/coating material used to embed within the fibre network was prepared by dispersing 47 weight parts of acetylene black (Shawinigan black from Chevron Chemicals, Houston, Tex., U.S.A.) in 1200 weight parts of water. To this was added 3 weight parts of PTFE as a dispersion in water (ICI Fluon dispersion GP1, 64 wt % solids suspension) and the mixture stirred to entrain the PTFE particles within the carbon black. The resultant material was dispersed using a high shear mixer (Silverson L4R) to produce a smooth mixture.

The carbon based filler/coating material was pressed into the non-woven carbon fibre sheet on one side, and leveled using a metal edge. The sheet was then dried at 200° C. for 1 minute. A further thin layer of the material was applied to the same side of the sheet; the structure was sandwiched between two sheets of filter paper and passed through a set of rollers to compact the layer. The sheet was then dried at 200° C. for 1 minute. Further additions of thin layers of the material were applied to the same side of the sheet with compaction and drying until a loading of 2.22 mg/$cm^2$ of carbon based filler/coating material within a structure containing 3.16 mg/$cm^2$ of carbon fibres was achieved. The resulting gas diffusion substrate sheet was fired, in air, to 300° C. for 20 minutes.

A catalyst material used for forming the electrocatalyst layer on the gas diffusion substrate was provided by dispersing 100 weight parts of a 40 wt % platinum on carbon black (Johnson Matthey HiSPEC™ FC40) in 30 weight parts of Nafion® EW1100 (E I DuPont De Nemours & Co.) as a 9.5 wt % dispersion in water, prepared according to methods described in EP 0 731 520. The particulate catalyst was dispersed in the Nafion® EW1100 solution using a high shear mixer (Silverson L4R) to produce a smooth catalyst ink.

Figure 2:
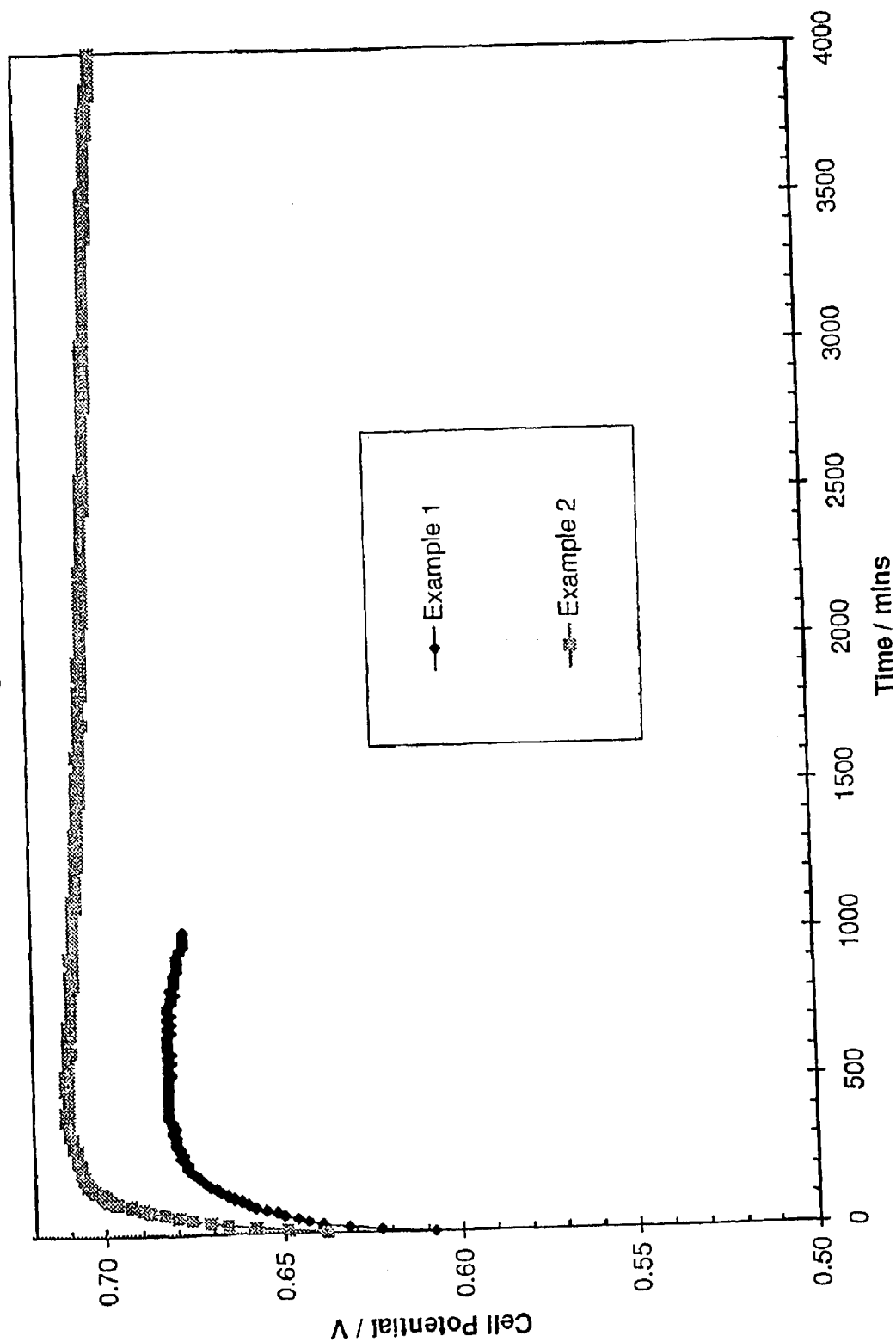
FIG. 2 shows the results of cell potential over time for exemplary embodiments of the present invention.
Figure 3:
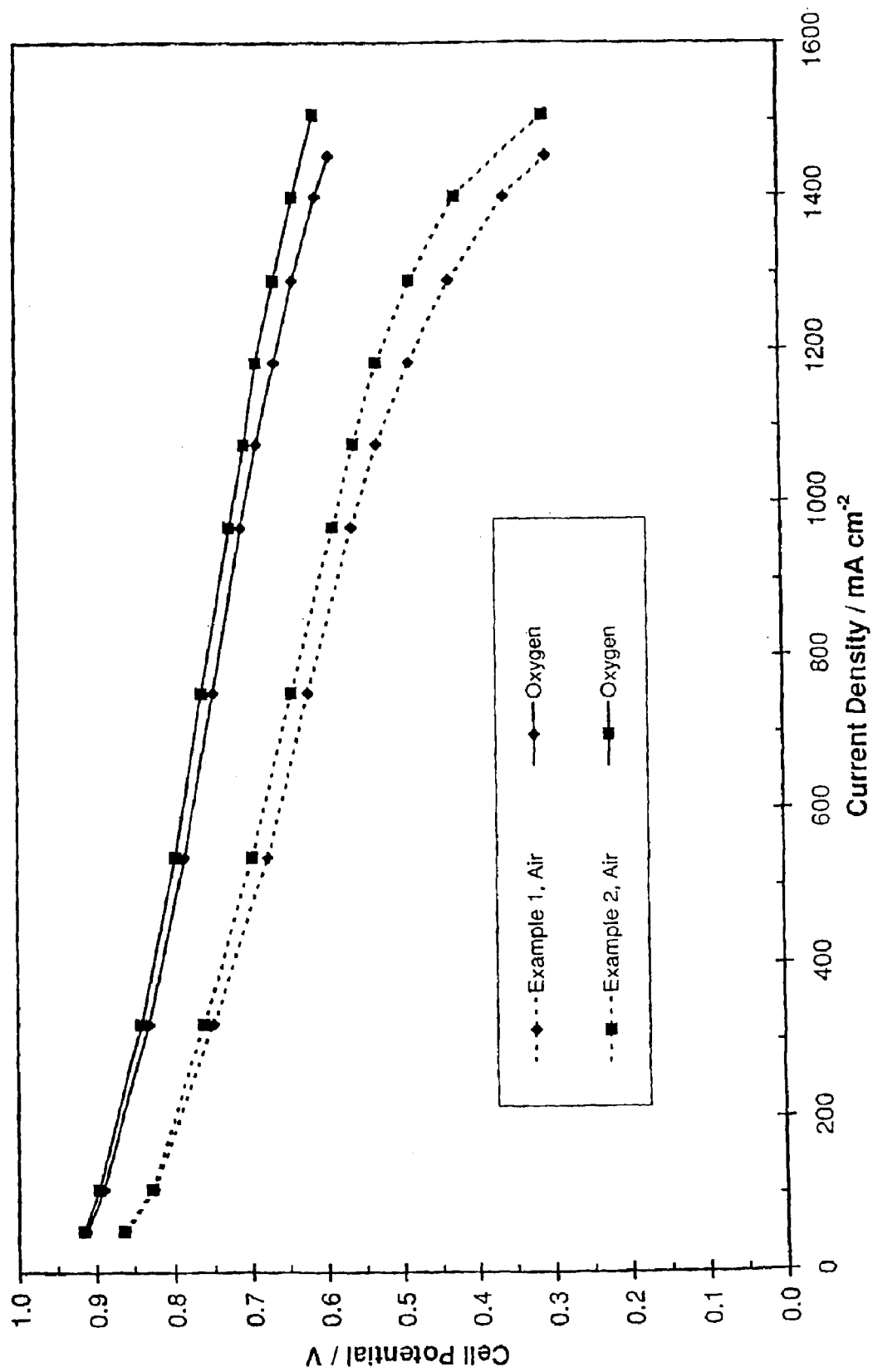
FIG. 3 is a plot of the cell potential versus current density for exemplary embodiments of the present Invention.

A layer of the catalyst material was then applied to the top face of the filled non-woven gas diffusion substrate, to give a loading of 0.4 mg Pt/$cm^2$. The electrode formed the cathode of an MEA, with the platinum electrocatalyst layer bonded to the membrane electrolyte face. The anode comprised rigid carbon fibre paper (Toray TOP-H-90 from Toray Industries Inc.) that had been treated with PTFE, with an electrocatalyst layer comprising a platinum/ruthenium on carbon catalyst (40 wt % Pt, 20 wt % Ru) at a loading of 0.45 mg Pt/$cm^2$. The membrane employed was Nafion® 112 (E I DuPont De Nemours & Co). The single cell results, for initial conditioning of the MEA at 500 mA/$cm^2$ are shown in FIG. 2 and the cell potential versus current density performance from the MEA for air and oxygen operation is presented in FIG. 3.

EXAMPLE 2

A further non-woven carbon fibre and nanofibre sheet, of size 330 mm diameter (855.3 $cm^2$), was prepared as for Example 1. The sheet was teflonated and fired in the same manner to give a PTFE loading of 33 wt %.

The carbon based filler/coating material (prepared as described in Example 1) was pressed into the non-woven carbon fibre sheet from one side of the sheet, and leveled using a metal edge. The sheet was then dried at 200° C. for 1 minute. A further thin layer of the particulate material was applied to the same side of the sheet; the structure was sandwiched between two sheets of filter paper and passed through a set of rollers to compact the layer. The sheet was then dried at 200° C. for 1 minute. This process was repeated for the second side of the sheet. Further additions of thin layers of the particulate material were applied alternately to each side of the sheet, with compaction and drying, until a loading of 3.43 mg/$cm^2$ of carbon based filler/coating material was achieved. The resulting gas diffusion substrate sheet was fired, in air, to 300° C. for 20 minutes.

A catalyst material used for forming the electrocatalyst layer on the gas diffusion substrate was provided as in Example 1.

A layer of the electrocatalyst material was then applied to the one face of the filled non-woven gas diffusion substrate, to give a loading of 0.4 mg Pt/cm$^2$. The electrode formed the cathode of an MEA, with the platinum catalyst layer bonded to the membrane electrolyte face. The anode comprised rigid carbon fibre paper (Toray TGP-H-90 from Toray Industries Inc.) that had been treated with PTFE, with an electrocatalyst layer comprising a platinum/ruthenium on carbon catalyst (40 wt % Pt, 20 wt % Ru) at a loading of 0.43 mg Pt/cm$^2$. The membrane employed was Nafion® 112 (E I DuPont De Nemours & Co). The single cell results, for initial conditioning of the MEA at 500 mA/cm$^2$ are shown in FIG. 2 and the cell potential versus current density performance from the MEA for air and oxygen operation is presented in FIG. 3.

EVALUATION OF EXAMPLES

The MEAs (240 cm$^2$ active area) were tested at 80° C. and 300kPa absolute H$_2$, air or oxygen gas pressure on anode and cathode. The conditioning curves in FIG. 2 show acceptable performance for both electrodes. The cell potential versus current density performance of both examples (FIG. 3) are typical of the performance from an electrode produced by the best current gas diffusion electrode technology.

What is claimed is:

1. A fuel cell gas diffusion substrate comprising primary fibres, secondary fibres in the form of carbon nanofibres, one or more thermoplastic polymers for binding said primary and secondary fibres and a carbon based filler/coating material, wherein the loading of the carbon based filler/coating material is more than 15 wt % based on the weight of the gas diffusion substrate.

2. A gas diffusion substrate according to claim 1, wherein the primary fibres have a cross-sectional dimension of at least 1 micron.

3. A gas diffusion substrate according to claim 1 or claim 2, wherein the primary fibres consist of longer fibres.

4. A gas diffusion substrate according to claim 1 or claim 2, wherein the primary fibres consist of shorter fibres.

5. A gas diffusion substrate according to claim 1 or claim 2, wherein the primary fibres consist of a combination of longer and shorter fibres.

6. A gas diffusion substrate according to claim 1 wherein the secondary fibres have a diameter in the range of from 10 nanometres to 500 nanometres.

7. A gas diffusion substrate according to claim 1 wherein the secondary fibres have a length in the range of from 1 micron to 100 micron.

8. A gas diffusion substrate according to claim 1 wherein the primary carbon fibres constitute between 10 and 90 wt % of the total weight of fibres and the secondary fibres constitute between 10 and 90 wt % on the same basis.

9. A gas diffusion substrate according to claim 1 wherein one or more continuous strands comprising a plurality of tertiary carbon fibres is embedded within the substrate.

10. A gas diffusion substrate according to claim 1, wherein the carbon based filler/coating material comprises a mixture of a particulate carbon and one or more polymers.

11. A gas diffusion substrate according to claim 1, wherein the carbon based filler/coating material further comprises a catalyst other than an electrocatalyst.

12. A gas diffusion substrate according to claim 1, wherein the carbon based filler/coating material further comprises a modifier material or materials.

13. A gas diffusion electrode comprising a gas diffusion substrate according to claim 1 and an electrocatalyst material.

14. A membrane electrode assembly comprising a gas diffusion substrate according to claim 1.

15. A membrane electrode assembly comprising a gas diffusion electrode according to claim 13.

16. A fuel cell comprising a gas diffusion substrate according to claim 1.

17. A fuel cell comprising a gas diffusion electrode according to claim 13.

18. A fuel cell comprising a membrane electrode assembly according to claim 14 or claim 15.

* * * * *